US011907599B2

(12) United States Patent
Cheng et al.

(10) Patent No.: US 11,907,599 B2
(45) Date of Patent: Feb. 20, 2024

(54) INFORMATION PROCESSING METHOD, APPARATUS, ELECTRONIC DEVICE, AND STORAGE MEDIUM

(71) Applicant: Lenovo (Beijing) Limited, Beijing (CN)

(72) Inventors: Tao Cheng, Beijing (CN); Xiaoyan Shi, Beijing (CN); Tianshu Ren, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/551,877

(22) Filed: Dec. 15, 2021

(65) Prior Publication Data

US 2022/0229620 A1 Jul. 21, 2022

(30) Foreign Application Priority Data

Jan. 19, 2021 (CN) .......................... 202110068705.7

(51) Int. Cl.
*G06F 3/048* (2013.01)
*G06F 3/14* (2006.01)
*G06F 9/451* (2018.01)
*G06F 3/0481* (2022.01)
*G06F 11/14* (2006.01)

(52) U.S. Cl.
CPC .......... *G06F 3/1407* (2013.01); *G06F 3/0481* (2013.01); *G06F 9/451* (2018.02); *G06F 11/1438* (2013.01)

(58) Field of Classification Search
CPC ...... G06F 3/1407; G06F 9/451; G06F 3/0481; G06F 11/1438
See application file for complete search history.

(56) References Cited

U.S. PATENT DOCUMENTS

| 7,383,469 | B2 * | 6/2008 | Yang | ................... G06F 11/0757 714/36 |
| 10,917,515 | B2 * | 2/2021 | Zhang | ............... H04M 1/72469 |
| 2021/0191741 | A1 * | 6/2021 | Li | ........................... G06F 9/451 |

FOREIGN PATENT DOCUMENTS

| CN | 106201166 A | 12/2016 |
| CN | 108205411 A | 6/2018 |
| CN | 109271223 A | 1/2019 |

* cited by examiner

*Primary Examiner* — Mahelet Shiberou
(74) *Attorney, Agent, or Firm* — ANOVA LAW GROUP, PLLC

(57) ABSTRACT

An information processing method applied to an electronic device includes monitoring whether the target application is abnormal in response to a target application being started when the electronic device is in a target display mode, and in response to the target application being abnormal, switching a window of the target application from a first window display mode to a second window display mode such that the target application adapts to a target display mode. In the target display mode, the window of the target application is in the first window display mode indicated by the target display mode.

12 Claims, 4 Drawing Sheets

INFORMATION PROCESSING METHOD, APPARATUS, ELECTRONIC DEVICE, AND STORAGE MEDIUM

CROSS-REFERENCE TO RELATED DISCLOSURE

The present disclosure claims the priority to Chinese Patent Application No. 202110068705.7, entitled "Information Processing Method, Apparatus, Electronic Device and Storage Medium", filed on Jan. 19, 2021, the entire content of which is incorporated herein by reference.

TECHNICAL FIELD

The present disclosure relates to the field of information processing technology, and in particular, to an information processing method, apparatus, electronic device, and storage medium.

BACKGROUND

With the intelligent development of portable electronic devices (e.g., mobile phones, tablets, etc.), more and more portable electronic devices can support a multi-window display mode like a computer, that is, they can display multiple windows at the same time.

However, for any application, the current portable electronic device system only supports a specific version of the application. Once the version of the application is upgraded, when the application is operated in the multi-window display mode, the application may have abnormal situation. At this time, the application may be closed, such that the user cannot continue to use the application in the multi-window mode, which causes inconvenience to the user.

Therefore, an immediate solution is required to solve the technical problem to prevent the application from being closed abnormally in the multi-window mode.

SUMMARY

According to one aspect of the present disclosure, an information processing method applied to an electronic device is provided. The information processing method includes monitoring whether the target application is abnormal in response to a target application being started when the electronic device is in a target display mode, and in response to the target application being abnormal, switching a window of the target application from a first window display mode to a second window display mode such that the target application adapts to a target display mode. In the target display mode, the window of the target application is in the first window display mode indicated by the target display mode.

According to another aspect of the present disclosure, an information processing apparatus applied to an electronic device is provided. The information processing apparatus includes a monitoring module configured to monitor whether the target application is abnormal in response to a target application being started when the electronic device is in a target display mode and a processing module configured to switch a window of the target application from a first window display mode to a second window display mode in response to the target application being abnormal, such that the target application adapts to the target display mode. The window of the target application is displayed in the first window display mode indicated by the target display mode.

According to further aspect of the present disclosure, an electronic device is provided. The electronic device includes a processor and a memory for storing a program. When executing the program, the processor is configured to monitor whether a target application is abnormal in response to the target application being started when the electronic device is in a target display mode, and in response to the target application being abnormal, switch a window of the target application from a first window display mode to a second window display mode such that the target application adapts to the target display mode. In the target display mode, the window of the target application is in the first window display mode indicated by the target display mode.

BRIEF DESCRIPTION OF THE DRAWINGS

In order to describe the technical solutions of the embodiments of the present disclosure more clearly, the following will briefly introduce the accompanying drawings required for the embodiments. Apparently, the drawings in the following description are only some embodiments of the present disclosure, which are useful in the existing technologies. Ordinary technicians can obtain other drawings based on these drawings without creative efforts.

The terms "first", "second", "third", "fourth", etc., if any, in the specification and claims and the above-mentioned drawings are used to distinguish similar parts, and are not necessarily used to describe specific order or sequence. It should be understood that the data used in this way can be interchanged under appropriate circumstances, so that the embodiments of the present disclosure described herein can be implemented in a sequence other than those illustrated here.

DETAILED DESCRIPTION OF THE EMBODIMENTS

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by a person of ordinary skill in the art without creative efforts shall fall within the protection scope of the disclosure.

The information processing method provided in the embodiments of the present disclosure can be used in an electronic device that is installed with an application program.

Figure 1:
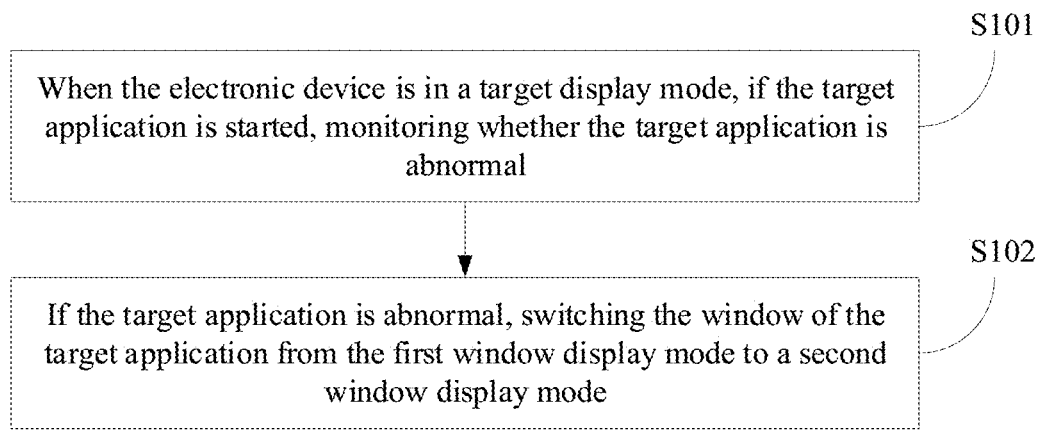
FIG. 1 is a flowchart of an implementation of an information processing method according to some embodiments of the present disclosure.

As shown in FIG. 1, a flow chart of an implementation of the information processing method according to the embodiments of the present disclosure may include:

S101: When the electronic device is in a target display mode, if the target application is started, monitoring whether the target application is abnormal. In the target display mode, a window of the target application is in a first window display mode indicated by the target display mode.

Figure 2A:
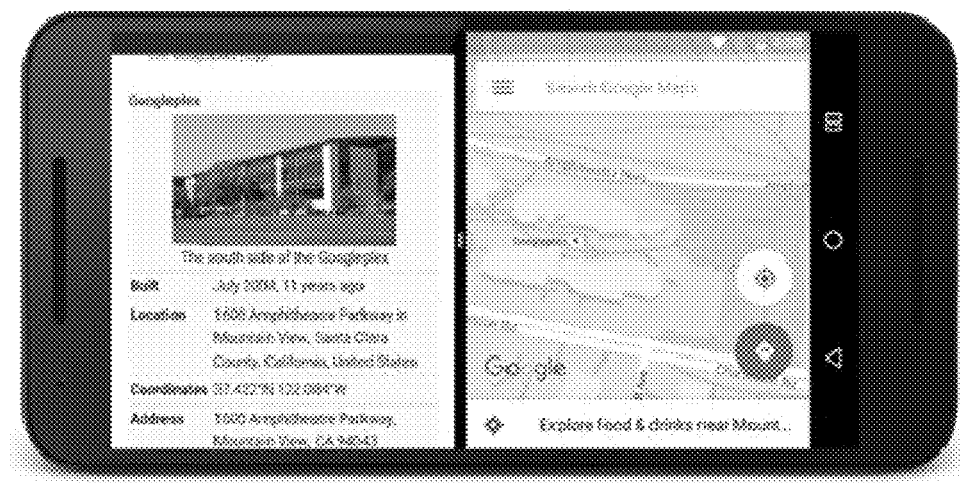
FIG. 2a is a schematic diagram illustrating an electronic device that divides a screen into two parts and displaying windows of two application programs on the split screen according to some embodiments of the present disclosure.

According to the embodiments of the present disclosure, the target display mode can be any of the following:

1. Split-screen display mode: The electronic device supports split-screen display windows, that is, the screen is divided into N (N is an integer greater than 1) portions, and N application windows are displayed at the same time. The display mode of the window of the target application indicated by the target display mode may be display in a partial area of the screen of the electronic device, that is, the window of the target application is displayed only in a partial area of the screen of the electronic device. As shown in FIG. 2a, the electronic device provided by the embodiments of the present disclosure may divide the screen into two portions and display two application programs in the split screen.

Figure 2B:
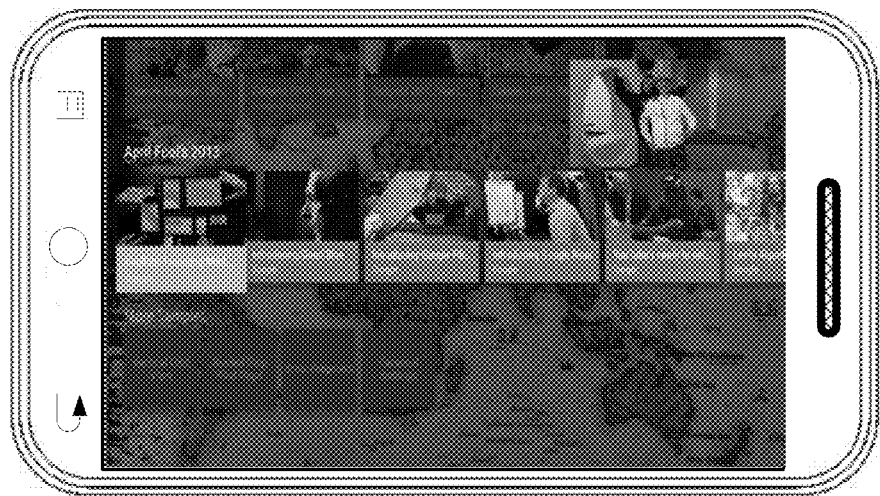
FIG. 2b is a schematic diagram illustrating the electronic device that supports a picture-in-picture mode according to some embodiments of the present disclosure.

2. Picture-in-picture mode: This mode is mainly for a video playback window. In this mode, the video playback window can be always displayed in a small window at a top level of the screen, and other functions of the electronic device can be used, such as chatting through instant messaging tools. The display mode of the window of the target application indicated by the target display mode may be display in a picture-in-picture manner, that is, the window of the target application is only displayed in the small window on the top level. As shown in FIG. 2b, the electronic device may support a picture-in-picture mode according to some embodiments of the present disclosure.

Figure 2C:
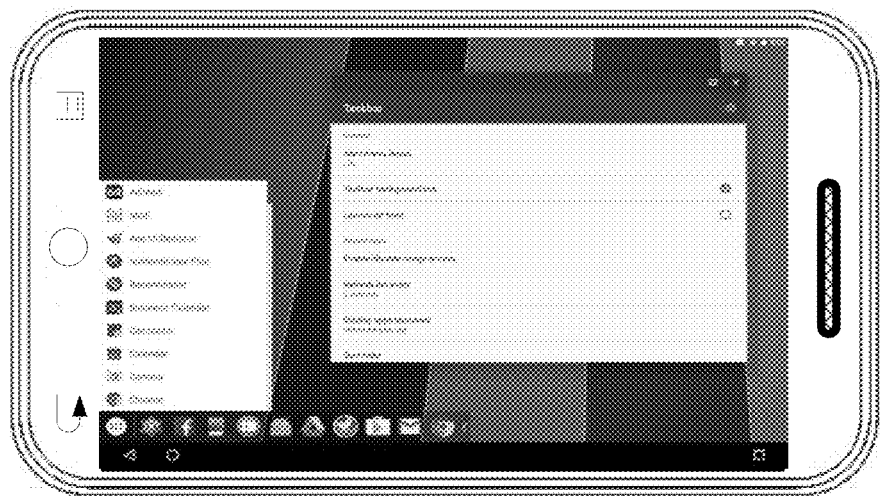
FIG. 2c is a schematic diagram of the electronic device that supports a window free control mode according to some embodiments of the present disclosure.

3. Free control mode: In this mode, similar to the common windows operating system, the window of the application program can be freely dragged and modified by a user. The display mode of the window of the target application indicated by the target display mode may be display in window free control mode, that is, the window of the target application can be displayed in a preset size, and the window can be dragged and/or changed a size of the window in response to user operations. As shown in FIG. 2c, the electronic device may support a window free control mode according to some embodiments of the present disclosure.

In any of the above modes, in response to an operation of an operating body (e.g., the user's finger, mouse, etc.) on the window of the target application, the window of the target application can be displayed in full screen.

In addition to the above-mentioned window display modes, when the electronic device is in a non-target display mode, the display mode of the window of the target application is usually a full-screen display mode.

The target application may be an application for any window displayed by the electronic device. The target application can be started either cold or warm, or it can be switched from background operation to foreground operation.

S102: If the target application is abnormal, switching the window of the target application from the first window display mode to a second window display mode, such that the target application adapts to the target display mode.

The adaptation of the target application to the target display mode is, when the electronic device is in the target display mode, and when the window of the target application is displayed in the second window display mode, the target application may not be abnormal.

In some embodiments, the second window display mode may be a predetermined window display mode.

In some embodiments, if it is impossible to determine which window display mode the window of the target application allows the application to adapt to the target display mode, the display mode of the window of the target application can be switched one by one. If the window of the target application is in the switched window display mode, the target application may generate an exception then switch to the next window display mode until the target application is no longer abnormal. The window display mode in which the window of the target application when the target application is no longer abnormal is determined to be the second window display mode.

In some embodiments of the present disclosure, when the electronic device is in the target display mode, if the target application is abnormal, the target application may not be closed, but the window of the target application may be switched from the first window display mode to the second window display mode to ensure that the target application can continue operation without being closed.

Figure 3:
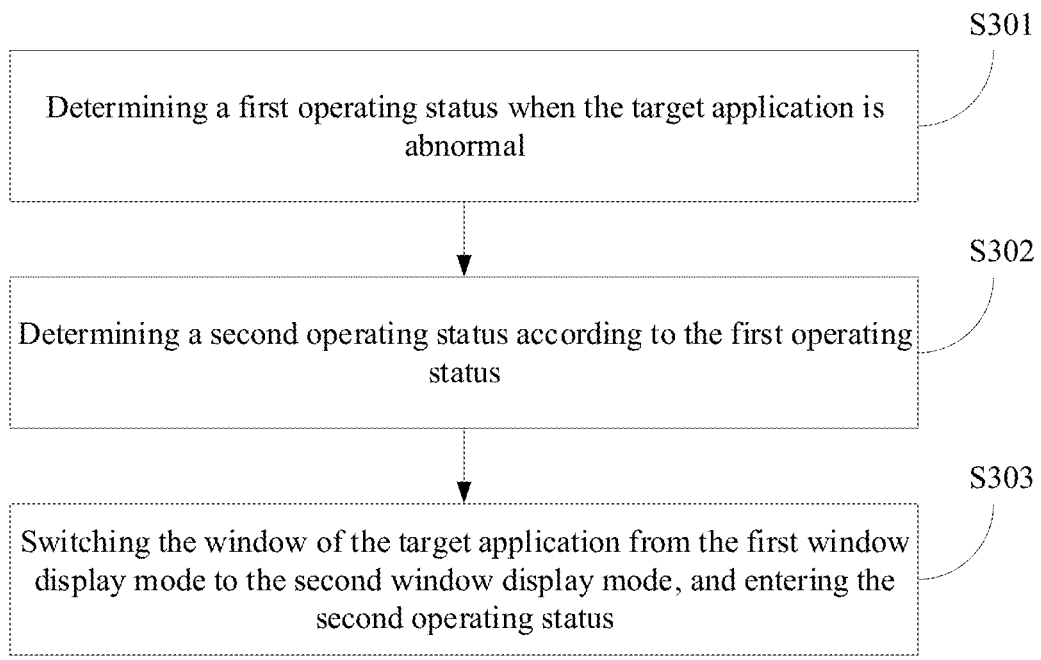
FIG. 3 is a flowchart of an implementation of switching the window of a target application from a first window display mode to a second window display mode according to some embodiments of the present disclosure.

In some embodiments, the foregoing implementation of switching the window of the target application from the first window display mode to the second window display mode as shown in FIG. 3 may include:

S301: Determining a first operating status when the target application is abnormal.

An operating status of an application can include at least but not limited to the following types or parts: start, generate a window, enlarge the window, diminish the window, close the window, operating in the foreground, operating in the background, sleeping, etc.

S302: Determining a second operating status according to the first operating status. A time when the target application enters the second operating status is earlier than a time when the target application enters the first operating status.

The first operating status and the second operating status may be two adjacent operating statuses, that is, the target application program may directly jump from the second operating status to the first operating status. Alternatively, the first operating status and the second operating status are not two adjacent operating statuses. For example, the target application first may jump from the second operating status to a third operating status and then jump from the third operating status to the first operating status.

S303: Switching the window of the target application from the first window display mode to the second window display mode, and entering the second operating status.

That is, when the target application is abnormal, not only the window of the target application is switched from the first window display mode to the second window display mode, but also the operating status of target application returns to the second operating status. This can reduce or avoid loss of user data while ensuring that the target application continues operating.

In some embodiments, the foregoing process of determining the first operating status and the second operating status may be: according to a state machine corresponding to the target application, determining the first operating status and the second operating status when the target application is abnormal.

The state machine of the target application may record various operating statuses during the operation of the target application and the jump relationships between the operating statuses. In addition, when the target application is in certain operating status, it can also interact with the user. Therefore, at least some of the operating statuses in the state machine of the target application are also associated with user data obtained by interacting with the user. The above-mentioned at least some of the operating statuses are the operating statuses of interacting with the user.

Accordingly, the first operating status when the target application is abnormal can be determined according to the state machine corresponding to the target application, and then the second operating status can be determined according to the state machine and the first operating status.

The first operating status may be the last operating status recorded by the state machine of the target application, and then the second operating status before the first operating status can be determined according to the jump relationship between the statuses.

In some embodiments, an implementation of switching the window of the target application from the first window display mode to the second window display mode and entering the second operating status may be: controlling the operating status of the target application program to roll back from the first operating status to the second operating status, and then controlling the window of the target application program to switch from the first window display mode to the second window display mode.

In an embodiment, when the target application is abnormal, the operating status of the target application may be controlled to roll back from the first operating status to the second operating status, and then the window of the target application may be controlled to be displayed in the second window display mode.

In some embodiments, an implementation of switching the window of the target application from the first window display mode to the second window display mode and entering the second operating status may be: restarting the target application, and controlling the target application to display in the second window display mode and entering the second operating status.

In an embodiment, when the target application is abnormal, the target application may be restarted, and the window of the target application may be controlled to be displayed in the second window display mode, and at the same time the target application may enter the second operating status.

After the target application enters the second operating status, if the second operating status is an operating status that can interact with the user, the associated user data can be obtained based on the operating status of the target application, thereby avoiding repeated operations by the user.

Figure 4:
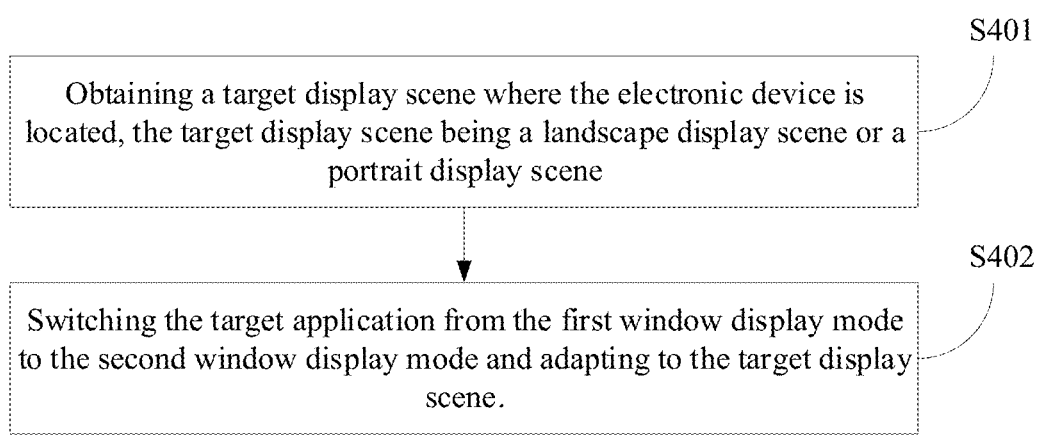
FIG. 4 is another flowchart of the implementation of switching the window of the target application from the first window display mode to the second window display mode according to some embodiments of the present disclosure.

In some embodiments, the foregoing implementation of switching the window of the target application from the first window display mode to the second window display mode as shown in FIG. 4 may include:

S401: Obtaining a target display scene where the electronic device is located, the target display scene being a landscape display scene or a portrait display scene.

Altitude information of the electronic device can be acquired based on a sensing device in the electronic device, and based on the altitude information, it can be determined whether the electronic device is in a landscape display scene or a portrait display scene. The sensing device may include but is not limited to, a gravity sensor.

S402: Switching the target application from the first window display mode to the second window display mode and adapting to the target display scene.

The target application can be first switched from the first window display mode to the second window display mode, and then the window of the target application in the second window display mode may be displayed in a manner to adapt to the target display scene. Alternatively, the window of the target application in the first window display mode may be first adapted to the target display scene, and then the window of the target application adapted to the target display scene may be displayed in the second window display mode.

In some embodiments of the present disclosure, when the target application is switched to the second window display mode, the window of the target application may also be controlled to adapt to the target display scene where the electronic device is located, thereby avoiding the inconvenience to the user caused by the window of the target application un-adapted to the target scene where the electronic device is located.

In some embodiments, an implementation of switching the window of the target application from the first window display mode to the second window display mode may be: determining the first operating status when the target application is abnormal; determining the second operating status according to the first operating status, the time when the target application enters the second operating status being earlier than the time when the target application enters the first operating status; acquiring the target display scene where the electronic device is located, the target display scene being a landscape display scene or a portrait display scene; and switching the window of the target application from the first window display mode to the second window display mode and adapting to the target display scene such that the window of the target application enters the second operating status.

In some embodiments, the above-mentioned second window display mode may be a full-screen display mode.

According to some embodiments of the present disclosure, the full-screen display mode of the application may be a mode tested when the application is online, that is, no matter what display mode the electronic device is in, the application can operate normally in the full-screen display mode. The application is tested before it is launched. Therefore, switching the display mode of the window of the target application to the full-screen display mode can ensure that the target application continues to operate normally.

Figure 5:
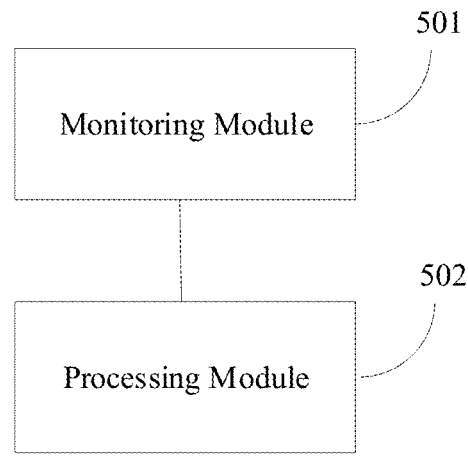
FIG. 5 is a structural diagram of an information processing apparatus according to some embodiments of the present disclosure.

Consistent with the embodiments of the present disclosure, an information processing apparatus may also be provided. A schematic structural diagram of the information processing apparatus according to the embodiments of the present disclosure is shown in FIG. 5 and may include a monitoring module 501 and a processing module 502.

The monitoring module 501 may be configured to: when the electronic device is in the target display mode, if the target application is started, monitor whether the target application is abnormal. In the target display mode, the window of the target application may be displayed in the first window display mode indicated by the target display mode.

The processing module 502 may be configured to switch the window of the target application from the first window display mode to the second window display mode if the target application is abnormal, so that the target application adapts to the target display mode.

In the information processing apparatus provided by the embodiments of the present disclosure, when the electronic device is in the target display mode, if the target application is abnormal, the target application may not be closed, but the window of the target application may be switched from the first window display mode to the second window display mode to ensure that the target application continues to run without being closed.

In some embodiments, the processing module 502 may include: a first determining unit configured to determine the first operating status when the target application is abnormal, and to determine the second operating status according to the first operating status, the time when the target application enters the second operating status being earlier than the time when the target application enters the first operating status; and a first switching unit configured to switch the window of the target application from the first window display mode to the second window display mode and enter the second operating status.

In some embodiments, the first determining unit may be specifically configured to: according to the state machine corresponding to the target application, determine the first operating status and the second operating status of the target application when the target application is abnormal.

In some embodiments, the first switching unit may be specifically configured to: restart the target application, and control the window of the target application to be displayed in the second window display mode and enter the second operating status.

In some other embodiments, the first switching unit may be specifically configured to control the operating status of the target application to roll back from the first operating status to the second operating status, and to control the window of the target application to switch from the first window display mode to the second window display mode for display.

In some embodiments, the processing module 502 may include: a scene acquisition unit configured to acquire a target display scene where the electronic device is located, the target display scene being a landscape display scene or a portrait display scene; and a second switching unit configured to switch the window of the target application from the first window display mode to the second window display mode and adapt to the target display scene.

In some other embodiments, the processing module 502 may include: a second determining unit configured to determine the first operating status when the target application is abnormal, and to determine the second operating status according to the first operating status, the time when the target application enters the second operating status being earlier than the time when the target application enters the first operating status; a scene acquisition unit configured to acquire the target display scene where the electronic device is located, the target display scene being a landscape display scene or a portrait display scene; and a third switching unit configured to switch the window of the target application from the first window display mode to the second window display mode and adapt to the target display scene, to allow the target application to enter the second operating status.

In some embodiments, the second window display mode may be a full-screen display mode.

Figure 6:
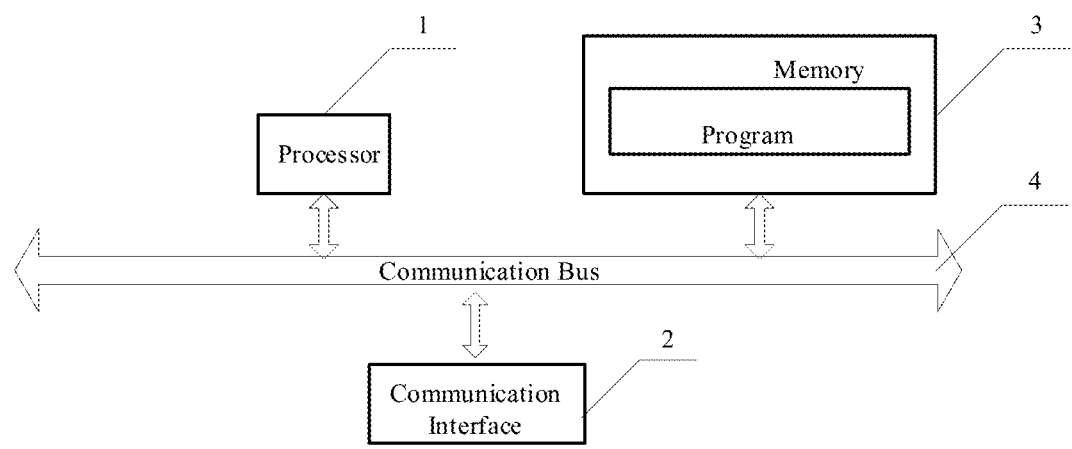
FIG. 6 is a block diagram of a hardware structure of the electronic device according to some embodiments of the present disclosure.

The information processing apparatus provided in the embodiments of the present disclosure can be applied to an electronic device, such as a portable electronic equipment (e.g., mobile phone, pad), personal computer (PC) terminal, and so on. FIG. 6 shows a block diagram of a hardware structure of the electronic device according to some embodiments of the present disclosure. In some embodiments, as shown in FIG. 6, the hardware structure of the electronic device may include at least one processor 1, at least one communication interface 2, and at least one memory 3 and at least one communication bus 4.

In some embodiments of the present disclosure, a number of the processor 1, a number of the communication interface 2, a number of the memory 3, and a number of the communication bus 4 may be at least one. The processor 1, the communication interface 2, and the memory 3 may communicate with each other through the communication bus 4.

The processor 1 may be a central processing unit (CPU), or an application-specific integrated circuit (ASIC), or one or more integrated circuits, etc., configured to implement the embodiments of the present disclosure.

The memory 3 may include a high-speed random-access memory (RAM), or may also include a non-volatile memory, for example, at least one magnetic disk memory.

The memory may store a program, and the processor can call the program stored in the memory to: when the electronic device is in the target display mode, if the target application is started, monitor whether the target application is abnormal, in the target display mode, the window of the target application being in the first window display mode indicated by the target display mode; and if the target application is abnormal, switch the window of the target application from the first window display mode to the second window display mode, so that the target application adapts to the target display mode.

The detailed functions and extended functions of the program may refer to the above description.

The embodiments of the present disclosure may also provide a storage medium, the storage medium may store a program suitable for execution by a processor, and the processor can call the program to: when the electronic device is in the target display mode, if the target application is started, monitor whether the target application is abnormal, in the target display mode, the window of the target application being in the first window display mode indicated by the target display mode; and if the target application is abnormal, switch the window of the target application from the first window display mode to the second window display mode, so that the target application adapts to the target display mode.

The detailed functions and extended functions of the program may refer to the above description.

A person of ordinary skill in the art can understood that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the disclosure.

In the embodiments of the present disclosure, it should be understood that the disclosed system, apparatus, and method can be implemented in other ways. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

It should be understood that, in the embodiments of the present disclosure, claims, various embodiments, and features therein can be combined with each other to solve the foregoing technical problems.

If the function is implemented in the form of a software functional unit and sold or used as an independent product, it can be stored in a computer-readable storage medium. Based on such understanding, the essential contribution of the technical solution of the present disclosure to the existing technology or the technical solution can be embodied in the form of a software product, and the computer software product may be stored in a storage medium, including several instructions configured to cause a computer device (e.g., a personal computer, a server, or a network device, etc.) to execute all or some of the steps of the methods described in the various embodiments of the present disclosure. The aforementioned storage medium may include flash drive, portable hard drive, read-only memory (ROM), RAM, magnetic disks or optical disks and other media that can store program codes.

The foregoing description of the disclosed embodiments enables those skilled in the art to implement or use the disclosure. Various modifications to these embodiments can be apparent to those skilled in the art, and the general principles defined herein can be implemented in other embodiments without departing from the spirit or scope of the disclosure. Therefore, the disclosure will not be limited to the embodiments included in the present disclosure, but should conform to the broadest scope consistent with the principles and novel features disclosed in the present disclosure.

What is claimed is:

1. An information processing method applied to an electronic device, the method comprising:
   when the electronic device is in a target display mode, in response to a target application being started, monitoring whether the target application is abnormal, wherein in the target display mode, a window of the target application is in a first window display mode indicated by the target display mode, the first window display mode being a non-full-screen display mode; and
   in response to the target application being abnormal, switching the window of the target application from a first window display mode to a second window display mode such that the target application adapts to the target display mode, the second window display mode being a full-screen display mode, and switching the window of the target application from the first window display mode to the second window display mode including:
      determining a first operation status when the target application is abnormal;
      determining a second operating status before the first operation status according to a jump relationship between the first operating status and the second operating status;
      controlling the target application to roll back from the first operating status to the second operating status; and
      controlling the window of the target application to switch from the first window display mode to the second window display mode for display.

2. The method according to claim 1, wherein determining the first operating status and the second operating status comprises:
   determining, according to a state machine corresponding to the target application, the first operating status and the second operating status of the target application when the target application is abnormal.

3. The method according to claim 1, wherein switching the window of the target application from the first window display mode to the second window display mode and entering the second operating status further comprises:
   restarting the target application, controlling the window of the target application to be displayed in the second window display mode, and entering the second operating status.

4. The method according to claim 1, wherein switching the window of the target application from the first window display mode to the second window display mode further comprises:
   acquiring a target display scene where the electronic device is located, the target display scene being a landscape display scene or a portrait display scene; and
   switching the window of the target application from the first window display mode to the second window display mode, and adapting to the target display scene.

5. The method according to claim 1, wherein the first operating status and the second operating status are different from each other and each include at least one of generating the window, diminishing the window, closing the window, operating in a foreground, operating in a background, or sleeping.

6. An information processing apparatus applied to an electronic device, the information processing apparatus comprising:
   a monitoring module configured to: when the electronic device is in a target display mode, in response to a target application being started, monitor whether the target application is abnormal, wherein in the target display mode, a window of the target application is displayed in a first window display mode indicated by the target display mode, the first window display mode being a non-full-screen display mode; and
   a processing module configured to switch the window of the target application from the first window display mode to a second window display mode in response to the target application being abnormal, such that the target application adapts to the target display mode, the second window display mode being a full-screen display mode, the processing module including:
      a first determining unit configured to determine a first operating status when the target application is abnormal, and to determine a second operating status before the first operating status according to a jump relationship between the first operating status and the second operating status; and
      a first switching unit configured to control the target application to roll back from the first operating status to the second operating status, and control the window of the target application to switch from the first window display mode to the second window display mode for display.

7. The information processing apparatus according to claim 6, wherein the processing module further comprises:
a scene acquisition unit configured to acquire a target display scene where the electronic device is located, the target display scene being a landscape display scene or a portrait display scene; and
a second switching unit configured to switch the window of the target application from the first window display mode to the second window display mode and adapt to the target display scene.

8. The information processing apparatus according to claim 7, wherein the processing module further comprises:
a third switching unit configured to switch the window of the target application from the first window display mode to the second window display mode and adapt to the target display scene, to allow the target application to enter the second operating status.

9. An electronic device, comprising:
a processor and a memory for storing a program, when executing the program, the processor being configured to:
when the electronic device is in a target display mode, in response to a target application being started, monitor whether the target application is abnormal, wherein in the target display mode, a window of the target application is in a first window display mode indicated by the target display mode, the first window display mode being a non-full-screen display mode; and
in response to the target application being abnormal, switch the window of the target application from the first window display mode to a second window display mode such that the target application adapts to the target display mode, the second window display mode being a full-screen display mode, and switching the window of the target application from the first window display mode to the second window display mode including:
determining a first operation status when the target application is abnormal;
determining a second operating status before the first operation status according to a jump relationship between the first operating status and the second operating status;
controlling the target application to roll back from the first operating status to the second operating status; and
controlling the window of the target application to switch from the first window display mode to the second window display mode for display.

10. The electronic device according to claim 9, wherein by determining the first operating status and the second operating status, the processor is further configured to:
determine, according to a state machine corresponding to the target application, the first operating status and the second operating status of the target application when the target application is abnormal.

11. The electronic device according to claim 9, wherein by switching the window of the target application from the first window display mode to the second window display mode and entering the second operating status, the processor is further configured to:
restart the target application, control the window of the target application to be displayed in the second window display mode, and enter the second operating status.

12. The electronic device according to claim 9, wherein by switching the window of the target application from the first window display mode to the second window display mode, the processor is further configured to:
acquire a target display scene where the electronic device is located, the target display scene being a landscape display scene or a portrait display scene; and
switch the window of the target application from the first window display mode to the second window display mode, and adapt to the target display scene.

\* \* \* \* \*